United States Patent [19]

Asam

[11] 4,148,553
[45] Apr. 10, 1979

[54] MULTIFIBER CABLE SPLICER

[75] Inventor: Adolf R. Asam, Daleville, Va.

[73] Assignee: International Telephone & Telegraph Corp.

[21] Appl. No.: 744,016

[22] Filed: Nov. 22, 1976

[51] Int. Cl.² .............................................. G02B 5/14
[52] U.S. Cl. ................................................. 350/96.21
[58] Field of Search ...... 350/96 C, 96 B, 96.20–96.22; 339/48, 49 B

[56] References Cited

U.S. PATENT DOCUMENTS

| 3,734,594 | 5/1973 | Tramburulo | 350/96 C |
| 3,768,146 | 10/1973 | Braun et al. | 350/96.21 |

FOREIGN PATENT DOCUMENTS 1450760  9/1976  United Kingdom ................. 350/96 C

*Primary Examiner*—Jon W. Henry
*Attorney, Agent, or Firm*—John T. O'Halloran; Peter C. Van Der Sluys

[57] ABSTRACT

A connector for joining one or more pairs of optical fibers uses a triangular cross-section to precisely align the fibers. One embodiment consists of a glass sleeve which is softened and crimped after inserting the fibers. The sleeve fuses with the fibers and forms a permanent connection.

17 Claims, 11 Drawing Figures

MULTIFIBER CABLE SPLICER

BACKGROUND OF THE INVENTION

Various types of connectors are employed for connecting between two or more optical fibers in an optical communications system. Each connector relies upon some means for centering and aligning the cores between the optical fiber to be connected in order that little light is lost at the point of contact. One means for aligning the cores of two opposing optical fibers is that proposed within U.S. patent application Ser. No. 613,390 (Kao 12-9), filed Sept. 15, 1975 now U.S. Pat. No. 4,047,796 and assigned to the assignee of the instant invention. This connector relies upon the principle that three points of contact are required to center a cylindrical rod. This mechanism is similar to that employed within the moveable jaws of a chucking mechanism similar to that used, for example, in electric hand-drills. In the aforementioned application three equi-distant cylindrical rods are employed to encompass an optical fiber such that each rod contacts the fiber at only one point. Other means are used to physically connect the fibers while the three-rod centering mechanism insures that the fibers remain in optical alignment during the coupling operation.

The purpose of this invention is to describe methods and apparatus for coupling one or a plurality of optical fibers to a corresponding one or a corresponding plurality of optical fibers in an optical communications system without the need for the three cylindrically aligned rods as described above.

SUMMARY OF THE INVENTION

A connector for optical communication fibers utilizes a hollow triangular connector cross-section to enclose each end of a pair of optical fibers which are to be coupled together. The circumference of each fiber contacts each side of the enclosing connector at only one point and becomes centered within the connector during the process of connection.

A plurality of connector cross-sections fixed together in a geometric array conveniently aligns and connects between each of the opposing optical fibers of multifiber optical bundles.

DESCRIPTION OF THE PREFERRED EMBODIMENT

Figure 1:
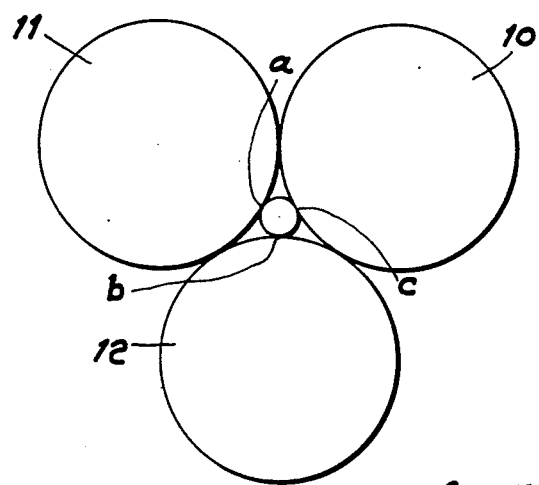
FIG. 1 is a cross-section of a prior art arrangement for centering optical fibers.

FIG. 1 shows the three-point principle for centering an optical fiber as described within the aforementioned U.S. application incorporated here by way of reference. Three equidistantly spaced cylinders 10, 11 and 12 surround an optical fiber 13 and contact the fiber at the three respective contact points a, b and c. The two fibers to be connected have their ends inserted on opposite ends of the cylinders. Both of the fibers become centered by contacting the cylinders (10, 11 and 12) so that their respective cores come into close optical alignment.

Figure 1A:
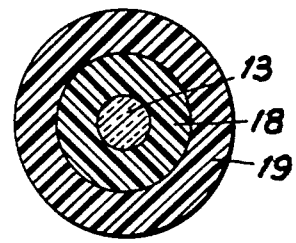
FIG. 1A is a cross-section of an optical communications fiber for use within the connector of this invention.
Figure 2:
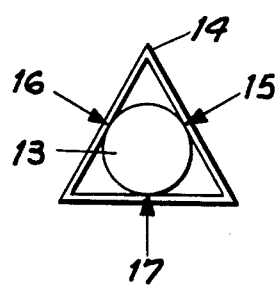
FIG. 2 is a cross-section of the arrangement for centering optical fibers for the connector of this invention.

The inventive connector of this invention can be seen by reference to FIG. 2 wherein a section of the connector has a similar connector configuration 14. The optical fiber 13 when inserted within the connector 14 contacts each of the three sides of connector 14 at points 15, 16 and 17, respectively, and become aligned concentrically with the enclosing connector 14. The material from which the connector 14 is constructed affords various functions to the connector manufacture herebefore unattainable in the field of optical communication connectors. When, for example, the optical fiber 13 is to be attached to the material of the connector 14 then the material of the connector 14 can be selected so as to readily fuse and combine with the material of fiber 13. It is also contemplated that the inner surface of connector 14 could be of a material that will fuse with the fiber material, this could be a separate layer of fusible material or the material of the connector. The connector may be formed of metal with an inner layer of plastic that may be fused to the optical fiber. The connector 14 would serve to secure both of the fibers of a pair to be connected and prevent them from slipping out of the connector 14. A typical optical fiber cam be seen by reference to FIG. 1A where the glass fiber 13 is enclosed in a first plastic coating 18 and an outer plastic jacket 19. When the fiber 13 is glass then the connector 14 can also consist of glass such that upon heating the fibers within the connector 14 the glass of the connector 14 would soften and fuse with the glass of the enclosed fiber 13. In some instances it is more feasible to insert the entire glass fiber within a connector for connecting to a similar glass fiber 15. Then the fiber jacket 19 would contact the appropriately sized plastic connector 14 and become aligned by the method described earlier and fused to the plastic of the connector 14 by heating or ultrasonic welding. For other applications it is more convenient to remove the plastic jacket 19 to expose the plastic coating 18 and insert the fiber 13 within plastic coating 18 to within the connector 14. If the connector 14 is fabricated of a plastic material then the plastic coating 18 could be fused to the plastic of the connector 14 for retaining the fiber within the connector. In some instances the connector 14 can be constructed of a suitable non-abrading metal and with the fiber 13, per se, or the plastic coating 18 enclosing fiber 13 or the jacket 19 enclosing both the fiber 13 and the coating 18 could be inserted within suitably sized metal connector 14. It is also contemplated that if additional mechanical strength is desired, the connector may be crimped to the fiber after it is softened.

Figure 3:
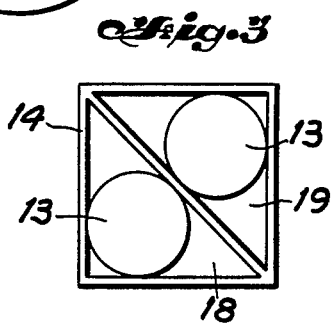
FIG. 3 is an arrangement for connecting two optical fibers within the connector of this invention.

When two optical fibers from one fiber bundle are to be connected with two similar optical fibers from another optical cable a connector 14 having the configuration shown in FIG. 3 where two optical fibers are inserted within separate sections 18 and 19, respectively, become centered and aligned as conveniently as the single fiber described in FIG. 2.

Figure 4:
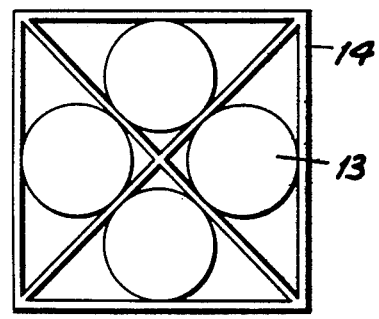
FIG. 4 is an arrangement for connecting four optical fibers within the connector of this invention.

When four optical fibers from one fiber cable are to be connected with four similar fibers from another optical cable the configuration in FIG. 4 can be utilized.

Figure 5:
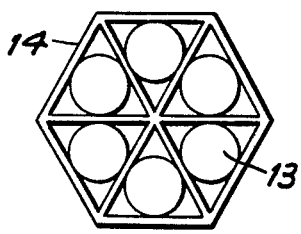
FIG. 5 is an arrangement for connecting six optical fibers within the connector of this invention.

FIG. 5 shows a connector 14 having facility for connecting six optical fibers.

Figure 7:
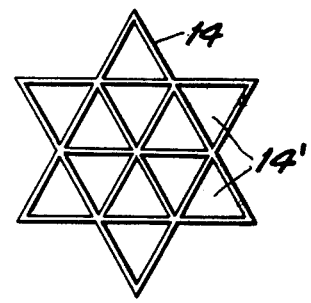
FIG. 7 is an end view of the connector of this invention for connecting twelve optical fibers.
Figure 8:
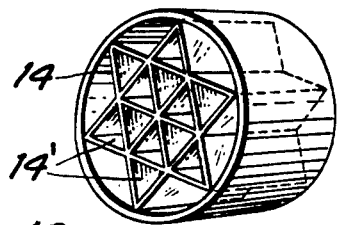
FIG. 8 is a perspective view of the connector of FIG. 7.

When a twelve fiber optical cable is to be connected with another twelve fiber optical cable in a field situation where the cable splice, for example, must be made quickly and without access to sophisticated tools and alignment circuitry, the configuration shown in FIG. 7 can be employed. Here the connector 14 contains 12 individual sub-connectors 14' into each of which a corresponding optical fiber can be inserted. When the ends of both fiber cables are trimmed with a hand-tool to remove a portion of the outer jacket and expose the plastic coated fiber the fibers from each fiber cable can be readily and conveniently inserted within the connector having the configuration shown in FIG. 7. FIG. 8 shows the configuration of the 12 fiber connector of FIG. 7 including a sleeve 20 which may be formed of materials such as glass, plastic or metal.

Figure 6:
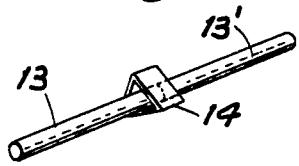
FIG. 6 is a perspective view of two optical fibers connected together by the inventive connector.

As shown in FIG. 6 two single fibers 13 and 13', respectively can be conveniently inserted into opposite ends of connector 14 for good optical alignment and mechanical connection.

Figure 10:
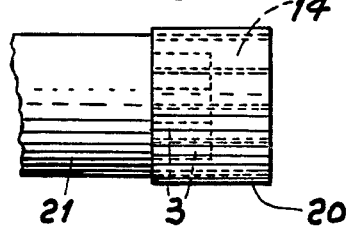
Figure 9:
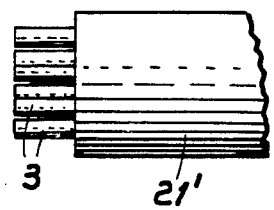
FIG. 9 is a side view of one bundle of 12 optical fibers to be connected to another bundle of 12 optical fibers, FIG. 10, by means of the connector of FIG. 8.

FIGS. 9 and 10 show how two bundles of 12 optical fibers 21 and 21', respectively, can be conveniently inserted within a 12 fiber connector similar to that of FIG. 8 for good optical and mechanical connection in a manner similar to the single fiber connector of FIG. 6.

Although the preferred embodiment is directed to connectors for optical communication fibers this is by way of example only. The invention finds application wherever good optical and mechanical alignment between light conductive fibers may be employed.

What is claimed is:

1. A connector for optical fibers comprising:
   a hollow member formed of a material that will fuse with a predetermined material, said member having a pair of opposing faces at each end thereof and a three-sided opening extending between said faces for receiving a pair of fibers to be connected; and
   an optical fiber having a surface of a predetermined material, said fiber fused within said opening by means of said member and said predetermined material.

2. A connector for optical fibers comprising:
   a hollow member having a pair of opposing faces at each end thereof and a three-sided opening extending between said faces for receiving a pair of fibers to be connected, the surfaces of the three-sided opening being formed of a fusible material; and
   an optical fiber fused within said opening by means of said fusible material.

3. An optical fiber connector, comprising:
   a hollow member having a pair of opposing faces at each end thereof and a three-sided opening extending between said faces; and
   at least one optical fiber having an end thereof disposed within the three-sided opening and fused to said hollow member.

4. A connector as described in claim 3, wherein the member is additionally crimped to the optical fiber.

5. An optical fiber connector, comprising:
   a hollow member having a pair of opposed faces at each end thereof and a three-sided opening extending between said faces, the surfaces of the three-sided opening being formed of a fusible material; and
   at least one optical fiber having an end thereof disposed in a three-sided opening and being fused to the surfaces of ssid opening.

6. A connector as described in claim 5 wherein the member is crimped to the optical fiber.

7. A connector for optical fibers having a predetermined diameter, said connector comprising:
   a hollow glass member having a pair of opposing faces at each end thereof and a three-sided opening extending between said faces for receiving a pair of fibers to be connected, the sides of the opening being formed and arranged so that each side will contact an inserted fiber only at one point to properly orient said fiber.

8. A connector for optical fibers having a predetermined diameter, said connector comprising:
   a plurality of tubular sleeves of triangular cross-section, each having a pair of opposing faces at each end thereof and a three-sided opening extending between said faces for receiving a pair of fibers to be connected, the sides of the opening being formed and arranged so that each side will contact an inserted fiber only at one point to properly orient said fiber, the tubular sleeves being arranged so that a side of each tubular sleeve contacts a side of one other tubular sleeve.

9. A connector for optical fibers having a predetermined diameter, said connector comprising:
   a plurality of tubular sleeves of triangular cross-section, said sleeves being arranged with an apex of each tubular sleeve contacting an apex of one other tubular sleeve, each of said tubular sleeves having a pair of opposing faces at each end thereof and a threesided opening extending between said faces for receiving a pair of fibers to be connected, the sides of the opening being formed and arranged so that each side will contact an inserted fiber only at one point to properly orient said fiber.

10. A connector for optical fibers having a predetermined diameter, said connector comprising:
    a plurality of tubular metal sleeves of triangular cross-section; and
    a metal tube of circular cross-section disposed about the plurality of tubular sleeves, each of said tubular sleeves having a pair of opposing faces at each end thereof and a three-sided opening extending between said faces for receiving a pair of fibers to be connected, the sides of the opening being formed and arranged so that each side will contact an inserted fiber only at one point to properly orient said fiber.

11. A connector for optical fibers having a predetermined diameter, said connector comprising:
    a plurality of tubular glass sleeves of triangular cross-section; and
    a glass tube of circular cross-section disposed about the plurality of tubular sleeves, each of said tubular sleeves having a pair of opposing faces at each end thereof and a three-sided opening extending between said faces for receiving a pair of fibers to be connected, the sides of the opening being formed and arranged so that each side will contact an inserted fiber only at one point to properly orient said fiber.

12. A connector for optical fibers comprising:
a hollow metallic member having a pair of opposing faces at each end thereof and a three-sided opening extending between said faces for receiving a pair of fibers to be connected, the sides of the opening being formed and arranged so that each side will contact an inserted fiber only at one point to properly orient said fiber;
a layer of fusible material disposed on the surface of each side of the three-sided opening; and
an optical fiber fused within said opening by means of said fusible material.

13. The connector of claim 12, wherein the fusible material comprises a plastic.

14. A connector for optical fibers comprising:
a hollow fusible member having a pair of opposing faces at each end thereof and a three-sided opening extending between said faces for receiving a pair of fibers to be connected, the sides of the opening being formed and arranged so that each side will contact an inserted fiber only at one point to properly orient said fiber; and
an optical fiber fused within said opening by means of said fusible member.

15. A connector as described in claim 14, wherein the fusible member is formed of a fusible material selected from the group of materials consisting of glass, plastic and metal.

16. A connector for optical fibers comprising:
a hollow member having a pair of opposing faces at each end thereof and a three-sided opening extending between said faces for receiving a pair of fibers to be connected, the sides of the opening being formed and arranged so that each side will contact an inserted fiber only at one point to properly orient said fiber;
a layer of fusible material formed on the surface of said side of said three-sided opening; and
an optical fiber fused to the surfaces of the three-sided opening by means of said fusible material.

17. A connector as described in claim 16 wherein the fusible material is selected from the group of materials consisting of glass, plastic and metal.

* * * * *